United States Patent Office 3,242,138
Patented Mar. 22, 1966

3,242,138
PROCESS FOR PREPARING POLY(AMINO-
STYRENE)
August Jean Van Paesschen, Begonialei 2,
Hove, Belgium
No Drawing. Filed Feb. 26, 1962, Ser. No. 175,827
Claims priority, application Belgium, Mar. 1, 1961,
40,476, Patent 600,768
3 Claims. (Cl. 260—65)

This invention relates to the preparation of poly(amino-styrene), intermediate products obtained during the preparation of poly(aminostyrene) and certain reaction products.

It is known to prepare poly(aminostyrene) by polymerization of aminostyrene or by reduction of poly(nitrostyrene).

By polymerizing aminostyrene only low molecular weight polymers are obtained and the polymerization of nitrostyrene to poly(nitrostyrene) is difficult to carry out. Orthonitrostyrene cannot be polymerized at all, para- and meta-nitrostyrene can only be polymerized to low molecular weight products (C. E. Schildknecht, Vinyl and Related Polymers, J. Wiley & Sons, Inc. (1952), p. 156).

It is further known to prepare higher molecular weight poly(aminostyrene) by reduction of poly(nitrostyrene) obtained by nitration of poly(styrene). This method, however, has the disadvantage that during the reduction of high molecular weight poly(nitrostyrene) polymers are formed which are insoluble in the common solvents. For this reason this method of preparation is generally only applied in order to prepare low molecular weight products.

It has now been found to prepare high molecular weight poly(aminostyrene) which is soluble in common solvents by converting a poly(acylstyrene) with hydrazoic acid in the presence of an excess of sulfuric acid into poly(acylaminostyrene) which is then hydrolyzed into poly(aminostyrene).

The hydrazoic acid can be prepared in situ by reacting sodium azide with the sulfuric acid present. Hydrazoic acid can, however, also be prepared separately for instance from sodium azide and sulfuric acid whereupon the formed hydrazoic acid is led into the reaction mixture of the dissolved poly(acylstyrene) and the excess of sulfuric acid.

The reaction can schematically be represented as follows:

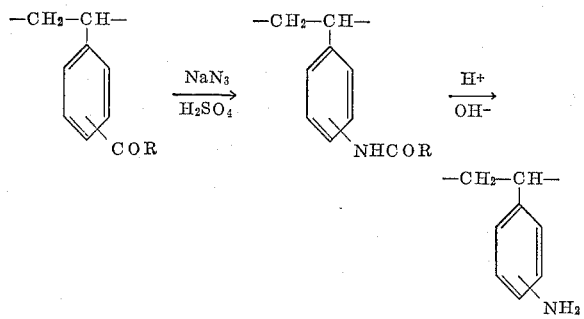

wherein R represents a lower alkyl radical such as a methyl radical or an aryl radical such as phenyl radical, and the substitutes occur in the o-, m- or p-position.

Poly(p-aminostyrene) is preferably prepared starting from poly(acetyl styrene) which is prepared by acetylation of poly(styrene) according to the method described in the U.S. patent specification 2,831,768. The polymer obtained according to this method is mainly acetylated in the para-position so that the amino substitution of the obtained poly(aminostyrene) will also occur in the para-position.

Poly(acetylstyrene) can also be prepared by polymerizing the monomer. It is evident that the acetyl group on the phenyl nucleus can also occur on other positions than the para-position with regard to the vinyl group. In this way para-, meta- and ortho-acetyl derivatives of poly-(styrene) can be prepared by polymerization and which after reaction give the corresponding amino derivatives.

The poly(acetyl aminostyrene), prepared starting from poly(acetyl styrene) according to U.S. patent specification 2,831,768 is a colorless high molecular weight compound which as distinct from poly(aminostyrene) resists to oxidation and thus remains colorless. The poly-(p-acetyl aminostyrene) is soluble in a mixture of water and water-miscible organic solvents.

The reaction according to this invention can also be carried out on copolymers of acyl styrene and monomeric unsaturated compounds which are inert with regard to the action of hydrazoic acid, preferably on copoly(acyl styrene/styrene), on copoly(acyl styrene/butadiene) and on copoly(acyl styrene/acrylonitrile).

For this reaction, polymers of other vinyl arylene alkyl ketones such as propionyl styrene or of vinyl arylene aryl ketones such as benzoyl styrene can also be used as starting materials. By hydrolyzing the formed poly(acyl aminostyrene) poly(aminostyrene) is always obtained.

The thus obtained poly(aminostyrene) is either a low or a high molecular weight product according to the molecular weight of the starting material. It is lightly colored, soluble in acid aqueous medium and unlimitedly keepable as in the form of its hydrochloride.

Poly(aminostyrene) and copolymers of aminostyrene are suited as mordanting agents for acid dyestuffs. Both are important intermediate products for further synthesis such as the preparation of high molecular weight azo dyes, ion exchangers, or sequestering polymers. Poly-(aminostyrene) condensed with tetramethyl-p,p'-diaminobenzhydrol (Michler's hydrol) gives poly[N-(p''-vinyl phenyl)-tetramethyl-p,p'-diamino benzhydryl amine], a product possessing photoelectric properties.

The following examples of preparations illustrate the method of preparing the above mentioned polymeric products.

I. *Preparation of poly(p-aminostyrene)*

This preparation is carried out by the following two steps:

(1) *Preparation of poly(p-acetyl amino styrene) from poly(p-acetyl styrene).*—40 g. of poly(p-acetyl styrene) which is prepared starting from poly(styrene) with an average molecular weight of 30,000 according to the method of C. Unruh and others described in the U.S. patent specification 2,831,768, are dissolved in 1600 cm.³ of acetic acid and 120 g. of strong sulfuric acid.

After complete dissolution the reaction mixture is heated to 60° C. With vigorous stirring, 26.8 g. of sodium azide are added in small portions. The temperature in the flask is kept at 60° C. by suitably cooling since the reaction is somewhat exothermic. The introduction of sodium azide in the reaction mixture results in the liberation of nitrogen and a gradual precipitation of the polymer.

After all the sodium azide has been added, the mixture is stirred for further 2 hours at 60° C. The mixture is then cooled, the acetic acid removed and replaced by distilled water. The sticky polymer becomes hard and is filtered off as a finely divided precipitate, after treatment with a dispersing stirrer. The polymer is washed with water until neutral reaction on litmus paper. The poly-(p-acetyl aminostyrene) can eventually be further purified by dissolving it in 4 parts of acetone and 1 part of water and then precipitating it with an excess of water.

Yield: 32 g.

The obtained polymer is soluble in organic solvents such as methanol, ethanol, acetone, dioxan, tetrahydrofuran and dimethyl formamide to which 20% of water has been added.

(2) *Hydrolysis of poly(p-acetyl aminostyrene) to poly-(p-amino styrene).*—7 g. of the prepared poly(p-acetyl amino styrene) are gradually dissolved, while stirring and refluxing, in a mixture of 200 cm.³ of ethanol, 13 g. of strong hydrochloric acid and 50 cm.³ of water. The azeotropic mixture ethanol-water is gradually distilled off while water is dropwise added. When all the ethanol is distilled off, the reaction mixture is still refluxed for 15 hours.

After cooling to room temperature, the poly(p-amino styrene) is set free from the poly (p-amino styrene) hydrochloride in the form of a fine precipitate by adding 500 cm.³ of ethanol to the aqueous acid solution and then alkalizing the reaction mixture.

The precipitated poly(p-amino styrene) is filtered off, washed until neutral and vacuum-dried.

Yield: 4.3 g.

II. *Preparation of poly[N-(p''-vinyl phenyl)-tetramethyl-p,p'-diamino benzhydryl amine]*

3.92 g. of poly(p-amino styrene) and 9.8 g. of tetramethyl-p,p'-diamino benzhydrol (Michler's hydrol) are refluxed for 16 hours at 100°–110° C. in 160 cm.³ of pure dioxan. The solution is then cooled and filtered through a nylon cloth. The filtrate is poured out into ether whereby the reaction product is precipitated. After drying the reaction product is redissolved in a mixture of tetrahydrofuran-pyridine and precipitated in acetone. After washing the polymer is vacuum-dried.

Yield: 3.6 g.

The reaction can schematically be represented as follows:

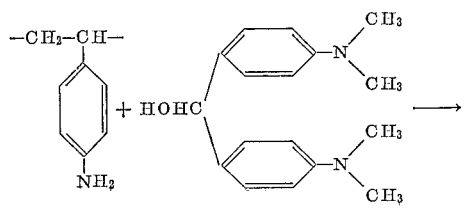

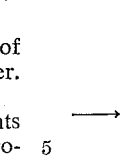

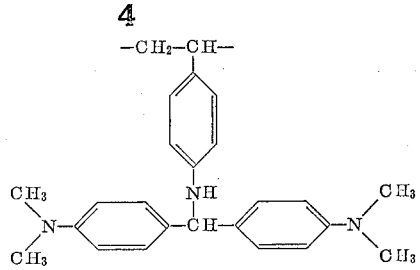

I claim:

1. Process for preparing a high molecular weight poly(aminostyrene) which is soluble in common solvents comprising converting a dissolved poly(acetyl styrene) of the formula

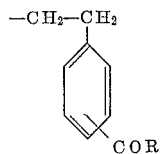

wherein R is selected from the group consisting of a lower alkyl radical and an aryl radical with hydrazoic acid in the presence of an excess of sulfuric acid, and hydrolyzing the formed poly(acetyl aminostyrene).

2. Process for preparing high molecular weight poly(p-aminostyrene) which is soluble in common solvents comprising converting dissolved poly(p-acetyl styrene) of the formula

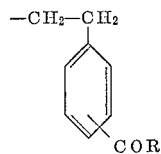

wherein R is selected from the group consisting of a lower alkyl radical and an aryl radical with hydrazoic acid in the presence of an excess of sulfuric acid, and hydrolyzing the formed poly(p-acetyl aminostyrene).

3. The reaction product of poly(p-amino styrene) and tetramethyl-p,p'-diaminobenzhydrol.

References Cited by the Examiner

UNITED STATES PATENTS

| | | | |
|---|---|---|---|
| 2,656,339 | 10/1953 | Padbury | 260—89.7 |
| 2,831,768 | 4/1958 | Merrill et al. | 260—63 X |
| 2,852,381 | 9/1958 | Minsk et al. | 260—89.7 |

WILLIAM H. SHORT, *Primary Examiner.*

JOSEPH R. LIBERMAN, *Examiner.*